United States Patent

Imana

(10) Patent No.: US 9,558,710 B2
(45) Date of Patent: Jan. 31, 2017

(54) TRANSITIONING OPERATION BETWEEN DEVICE DISPLAY SCREENS AND INTERFACE THEREFOR

(71) Applicant: Rakuten Kobo Inc., Toronto (CA)

(72) Inventor: Juan Ernesto Salas Imana, Toronto (CA)

(73) Assignee: RAKUTEN KOBO INC., Toronto (CA)

(*) Notice: Subject to any disclaimer, the term of this patent is extended or adjusted under 35 U.S.C. 154(b) by 0 days.

(21) Appl. No.: 14/597,920

(22) Filed: Jan. 15, 2015

(65) Prior Publication Data

US 2016/0210932 A1 Jul. 21, 2016

(51) Int. Cl.
 G06F 3/038 (2013.01)
 G09G 5/00 (2006.01)
 G06F 3/14 (2006.01)
 G06F 3/0488 (2013.01)
 G06F 3/0484 (2013.01)

(52) U.S. Cl.
 CPC .......... *G09G 5/003* (2013.01); *G06F 3/0488* (2013.01); *G06F 3/04847* (2013.01); *G06F 3/1423* (2013.01); *G09G 2360/144* (2013.01); *G09G 2380/14* (2013.01)

(58) Field of Classification Search
 None
 See application file for complete search history.

(56) References Cited

U.S. PATENT DOCUMENTS

| | | | | |
|---|---|---|---|---|
| 2008/0150432 A1* | 6/2008 | Rudiger | .......... | H05B 33/08 315/150 |
| 2013/0265257 A1* | 10/2013 | Jung | .......... | G06F 3/0412 345/173 |
| 2015/0054725 A1* | 2/2015 | Chen | .......... | G09G 3/3648 345/102 |
| 2015/0116344 A1* | 4/2015 | Won | .......... | G09G 3/32 345/589 |
| 2016/0063951 A1* | 3/2016 | Ikizyan | .......... | G09G 5/02 345/590 |

* cited by examiner

*Primary Examiner* — Joseph Haley
*Assistant Examiner* — Ifedayo Iluyomade
(74) *Attorney, Agent, or Firm* — Oblon, McClelland, Maier & Neustadt, L.L.P.

(57) ABSTRACT

A method and system for transitioning operation between display screens of a computing device, with a user interface. The device further includes primary and secondary touch screen displays, an ambient lighting brightness sensor, a memory storing instructions and an e-book having content displayable according to a series of digitally constructed pages. The method comprises receiving, at a screen transition interface presented on one of the primary display screen and the secondary display screen, selections of an upper and a lower brightness threshold limits of ambient lighting, sensing a brightness level of ambient lighting, activating the secondary display screen for operation only if one of: (i) the ambient lighting brightness level exceeds the upper threshold limit and (ii) the ambient lighting brightness level is less than the lower threshold limit, and transitioning operation of the computing device to the secondary display screen by rendering the pages of e-book content thereon.

20 Claims, 4 Drawing Sheets

TRANSITIONING OPERATION BETWEEN DEVICE DISPLAY SCREENS AND INTERFACE THEREFOR

TECHNICAL FIELD

Examples described herein relate to a system and method for operating a computing device equipped with dual display screens and transitioning operation there between.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O, Kobo GLO and the like).

Some electronic personal display devices are purpose built devices designed to perform especially well at displaying digitally stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, such devices may incorporate a touch screen display having integrated touch sensors and touch sensing functionality, whereby user input commands via touch-based gestures are received thereon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION

"E-books" are a form of electronic publication content stored in digital format in a computer non-transitory memory, viewable on a computing device having display functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers") can display digitally-stored content in a more reading-centric manner, while also providing, via a user input interface, the ability to manipulate that content for viewing, such as via discrete pages arranged sequentially (that is, pagination) corresponding to an intended or natural reading progression, or flow, of the content therein.

An "e-reading device", variously referred to herein as an electronic personal display or mobile computing device, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultra-mobile computing device, or a wearable computing device with a form factor of a wearable accessory device (e.g., smart watch or bracelet, glass-wear integrated with a computing device, etc.). As another example, an e-reading device can include an e-reader device, such as a purpose-built device that is optimized for an e-reading experience (e.g., with e-Ink displays).

While engaged in an immersive e-reading experience, a combination of factors such as ambient lighting brightness, reflection and glare from the display screen while viewing displayed content may significantly affect reading comfort and enjoyment of the user's reading experience. A user should ideally be able to read comfortably for extended periods of time on the device display screen, to provide a digital reading experience that is comparable to the natural convenience of reading a physical paper book.

Figure 1:
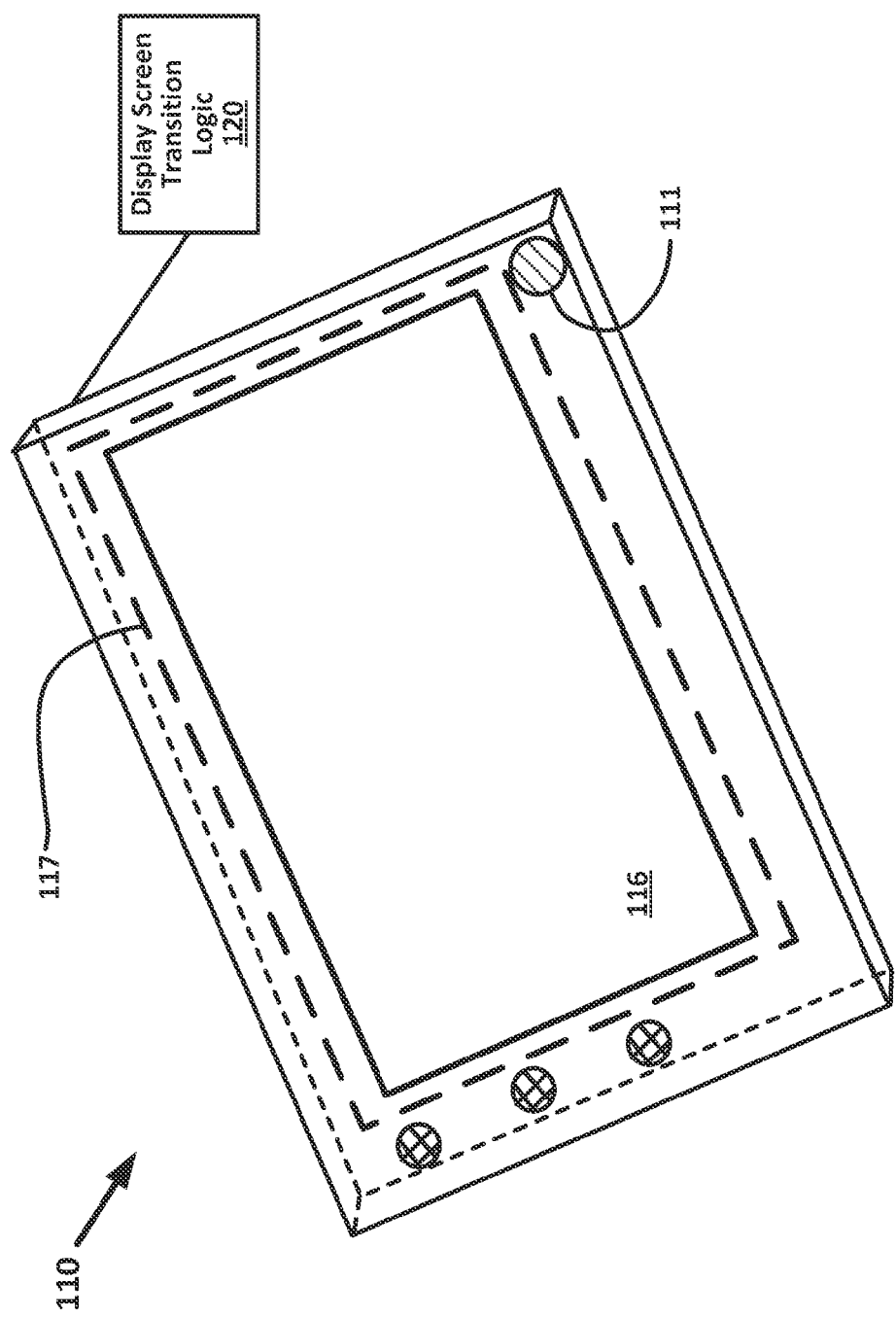
FIG. 1 illustrates a computing device configured with dual display screens, and operation in transitioning between the screens, in an embodiment.

FIG. it illustrates a computing mobile device 110, in one embodiment configured for operation of a primary display screen 116 and a secondary display screen 117. In the example of FIG. 1, computing device 110 comprises an electronic personal display device, shown by way of example as e-reading device 110.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reader application that links the device to a network service and enables e-books provided through the service to be downloaded and stored, for consumption by way of e-reading. In another implementation, the e-reading device 110 can run a media playback or streaming application that receives files or streaming data from the network service. By way of example, the e-reading device 110 can be equipped with hardware and software to optimize certain application activities, such as reading electronic content (e.g., e-books). For example, the e-reading device 110 can have a tablet-like form factor, although variations are possible. In some cases, display screen 116 of e-reading device 110 may be a liquid crystal display and display screen 117 may be an e-ink display or bi-stable display.

In additional detail, the network service can include a content store server and a user account electronic library (e-library) storing e-books or digital content items. In some embodiments, the content store server and user account e-library may be implemented via server computing devices, as well as a server cloud computing system. The content store server may be an online store for purchasing of digital content items for download there from onto a resident memory of an e-reading device 110 and/or the user account e-library which associates the e-reading device 110 with a user having an account. The user account can also be associated with ownership of, and/or accessibility to, one or more e-books and digital content items stored in content store server.

Further with reference to an example depiction of FIG. 1, the display screens 116, 117 may be touch-sensitive, to process touch inputs including gestures (e.g., swipes). For example, the display screens 116, 117 may be integrated with one or more touch sensors to provide a touch-sensing region on their respective display surfaces. For some embodiments, the one or more touch sensors may include capacitive sensors that can sense or detect a human body's capacitance as input. In the example of FIG. 1, the touch-sensing region coincides with a substantial surface area, if not all, of the display screens 116, 117 respectively.

In some embodiments, the e-reading device 110 includes features for providing functionality related to displaying paginated content, including paginated content comprising an e-magazine or e-comic book. The e-reading device 110 can include page transitioning logic, which enables the user to transition through paginated content. The e-reading device 110 can display pages of e-books, e-magazines and e-comics, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic can operate to enable the user to transition from a given page state to another page state In the specific example embodiment where a given page state coincides with a single page, for instance, each page state corresponding to one page of the digitally constructed, ordered sequence of pages paginated to comprise, in one embodiment, an e-book. In some implementations, the page transitioning logic enables single page transitions, chapter transitions, or cluster transitions (multiple pages at one time).

According to some embodiments, the e-reading device 110 includes display sensor logic to detect and interpret user input or user input commands made through interaction with the touch sensors of display screens 116, 117. By way of example, display sensor logic can detect a user making contact with the touch-sensing region of the display screens 116, 117, otherwise referred to herein as a touch event. More specifically, display sensor logic can detect a touch event also referred to herein as a tap, an initial tap held in contact at display screens 116, 117 for longer than some pre-defined threshold duration of time (otherwise known as a "long press" or a "long touch"), multiple taps performed either sequentially or generally simultaneously, swiping gesture actions made through user interaction with the touch sensing region of the display screens 116, 117 or any combination of these gesture actions. Although referred to herein as a "touch" or a tap, it should be appreciated that in sonic design implementations, sufficient proximity to the screen surface, just short of actual physical contact, may register a "contact" or a "touch event". Furthermore, display sensor logic can interpret such interactions in a variety of ways. For example, each such interaction may be interpreted as a particular type of user input associated with a respective input command, execution of which may trigger a change in state at touch screen displays 116, 117.

Still with reference to FIG. 1, light-sensing arrangement 298 for sensing a level of ambient light, in one embodiment, includes an optical window 111 integrated into a housing of e-reader device 110. The optical window 111, typically made of a material that substantially transmits visible light, such as poly-methyl-methacrylate (PMMA), polycarbonate (PC) or the like, may also be integrated into display elements of display screens 116, 117 during a manufacturing process, such as via injection-molding. Optical window 1 ii may be in optical communication via a light guide arrangement with one or more light-sensitive components, such as a light-emitting diode, phototransistor or photo-resistor, resident on a printed circuit board having hardware components of e-reader device 110. In another embodiment of ambient light-sensing arrangement 298, a liquid crystal display embodiment of touch screen display 116 may be lighted by an electro-luminescent panel fitted behind it, serving as the light-sensitive component that detects ambient lighting levels. In either of the above example embodiments of ambient light sensor 298, indications of ambient lighting are sensed, together with changes in the ambient lighting brightness levels.

Display screen transition logic module 120 provides, in an embodiment, an interface system and tool for transitioning operation between touch screen displays 116, 117 of display device 110. Display screen transition logic module 120 includes logic providing, in part, to accomplish transitioning between activation and operation of touch screen displays 116, 117 based on the prevailing ambient brightness level, for example as sensed at the light sensor arrangement via optical window 111 incorporated within e-reader device 110.

Display screen transition logic module 120 can be implemented as software modules comprising instructions stored in a memory of a computing device such as the content store server and/or display device 110. One or more embodiments of display screen transition logic module 120 described herein may be implemented using programmatic modules or components. A programmatic module or component may include a program, a subroutine, a portion of a program, or a software or a hardware component capable of performing one or more stated tasks or functions in conjunction with one or more processors. As used herein, a module or component can exist on a hardware component independently of other modules or components. Alternatively, a module or component can be a shared element or process of other modules, programs and hardware components.

Furthermore, the one or more embodiments of display screen transition logic module 120 described herein may be implemented through instructions that are executable by one or more processors. These instructions may be stored on a computer-readable non-transitory medium. In particular, the numerous computing and communication devices shown with embodiments of the invention include processor(s) and various forms of computer memory, including volatile and non-volatile forms, storing data and instructions. Examples of computer-readable mediums include permanent memory storage devices, such as hard drives on personal computers or servers. Other examples of computer storage mediums include portable storage units, flash or solid-state memory (such as included on many cell phones and consumer electronic devices) and magnetic memory. Computers, terminals, network enabled devices (e.g., mobile devices such as cell phones and wearable computers) are all examples of machines and devices that utilize processors, memory, and instructions stored on computer-readable mediums. Additionally, embodiments may be implemented in the form of computer-programs, or a computer usable storage medium capable of storing such a program.

Figure 2:
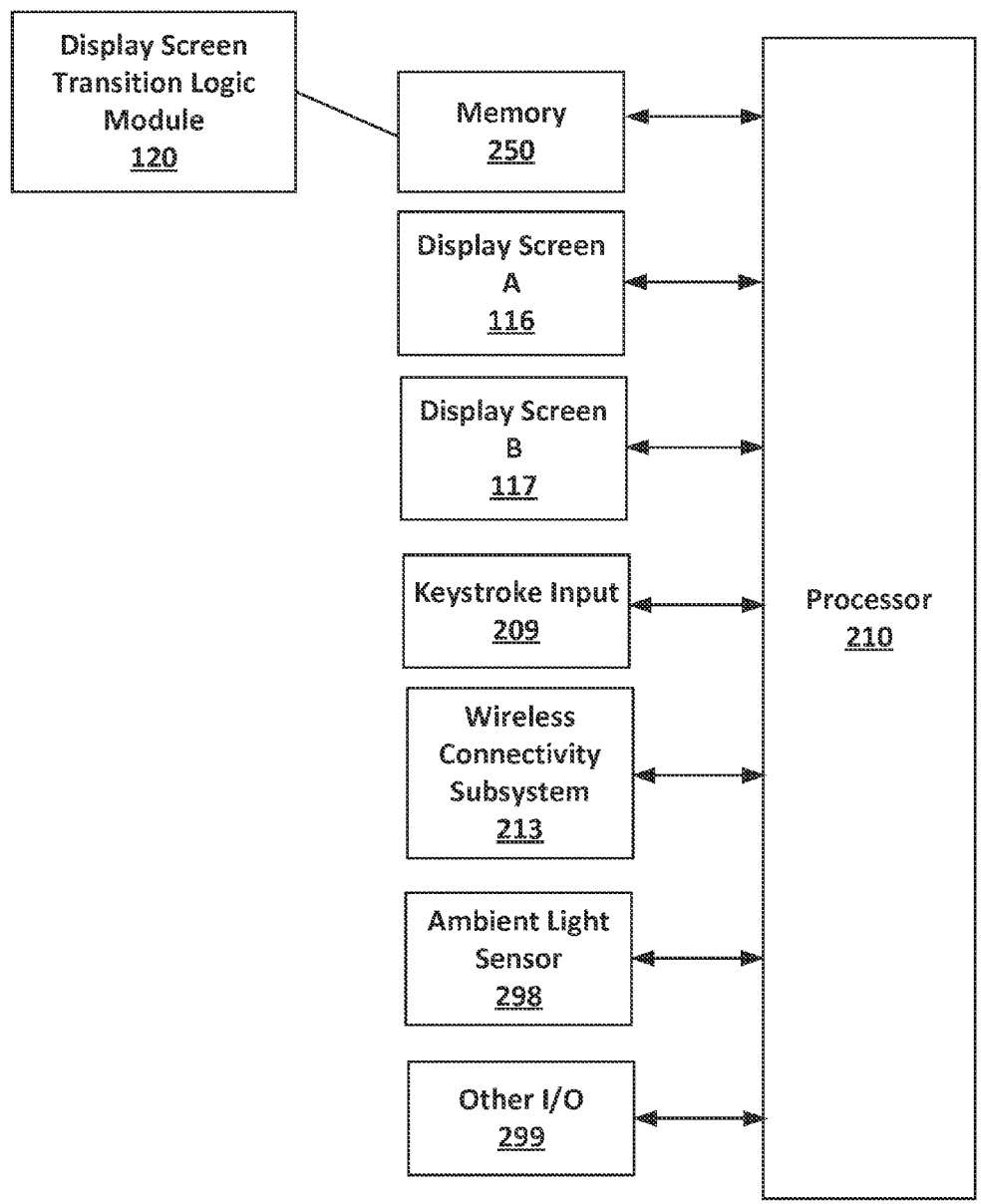
FIG. 2 illustrates a schematic architecture of a computing device configured with dual display screens, and operation in transitioning between the screens, according to an embodiment.

With reference now to FIG. 2, illustrated is a schematic architecture of a mobile computing device, such as a tablet or e-reader, configured for transition operation between dual display screens 116, 117, according to an embodiment.

E-reading device 110 further includes processor 210, a memory 250 storing instructions and logic pertaining at least to display sensor logic and display screen transition logic module 120.

Processor 210 can implement functionality using the logic and instructions stored in memory 250. Additionally, in some implementations, processor 210 communicates with the network service. More specifically, the e-reading device 110 can access the network service to receive various kinds of resources (e.g., digital content items such as e-books, configuration files, account information), as well as to provide information (e.g., user account information, service requests etc.). For example, e-reading device 110 can receive application resources, such as e-books or media files, that the user elects to purchase or otherwise download via the network service 121. The application resources, including e-books having content organized as a series of digitally constructed pages, that are downloaded onto the e-reading device 110 can be stored in memory 250.

In some implementations, primary display screen 116 can correspond to, for example, a liquid crystal display (LCD) or light emitting diode (LED) display that illuminates in order to provide content generated from processor 210. In some implementations, display 116 can be touch-sensitive. For example, in some embodiments, one or more of the touch sensor components may be integrated with display 116. In other embodiments, the touch sensor components may be provided (e.g., as a layer) above or below display 116 such that individual touch sensor components track different regions of display 116.

Secondary display 117 can correspond to an electronic paper type display, such as an e-ink or bi-stable display that mimic conventional paper in the manner in which content is displayed. Typically, e-ink displays are more suited to e-reading under extreme ambient lighting conditions, such as very bright daylight or in near-darkness at bedtime, for long, immersive periods, resulting is less eye strain as compared to reading, for example, on an LCD display screen. Examples of such electronic paper display technologies include electrophoretic displays, electro-wetting displays, and electro-fluidic displays. Display 117 can also be touch-sensitive; for example, in some embodiments, one or more of the touch sensor components may be integrated with display 117, providing touch screen capability.

Processor 210 can receive input from various sources, including touch sensor components at displays 116, 117, keystroke input 208 such as from a virtual or rendered keyboard, and other input mechanisms 299 (e.g., buttons, mouse, microphone, etc.). With reference to examples described herein, processor 210 can respond to input detected at the touch sensor components. In some embodiments, processor 210 responds to inputs from the touch sensor components in order to facilitate or enhance e-book activities such as generating e-book content on displays 116, 117, performing page transitions of the displayed e-book content, powering off the device 110 and/or displays 116, 117, activating a screen saver, launching or closing an application, and/or otherwise altering a state of displays 116, 117.

In some embodiments, memory 250 may store display sensor logic that monitors for user interactions detected through the touch sensor components, and further processes the user interactions as a particular input or type of input. In an alternative embodiment, display sensor logic module may be integrated with the touch sensor components. For example, the touch sensor components can be provided as a modular component that includes integrated circuits or other hardware logic, and such resources can provide some or all of display sensor logic. In variations, some or all of display sensor logic may be implemented with processor 210 (which utilizes instructions stored in memory 250), or with an alternative processing resource.

E-reading device 110 further includes wireless connectivity subsystem 213, comprising a wireless communication receiver, a transmitter, and associated components, such as one or more embedded or internal antenna elements, local oscillators, and a processing module such as a digital signal processor (DSP) (not shown). As will be apparent to those skilled in the field of communications, the particular design of wireless connectivity subsystem 213 depends on the communication network in which display device 110 is intended to operate, such as in accordance with Wi-Fi, Bluetooth, Near Field Communication (NFC) communication protocols, and the like.

Display screen transition logic module 120 can be implemented as a software module, comprising instructions stored in memory 250, on mobile display device 110. In one implementation, the local memory 250 can include records for each e-book in the user's e-library account. The user may have the content portion of select books archived remotely at a computer server cloud system, so as not to reside in the local memory 250, but be provided by the network service upon request or as needed.

Figure 3:
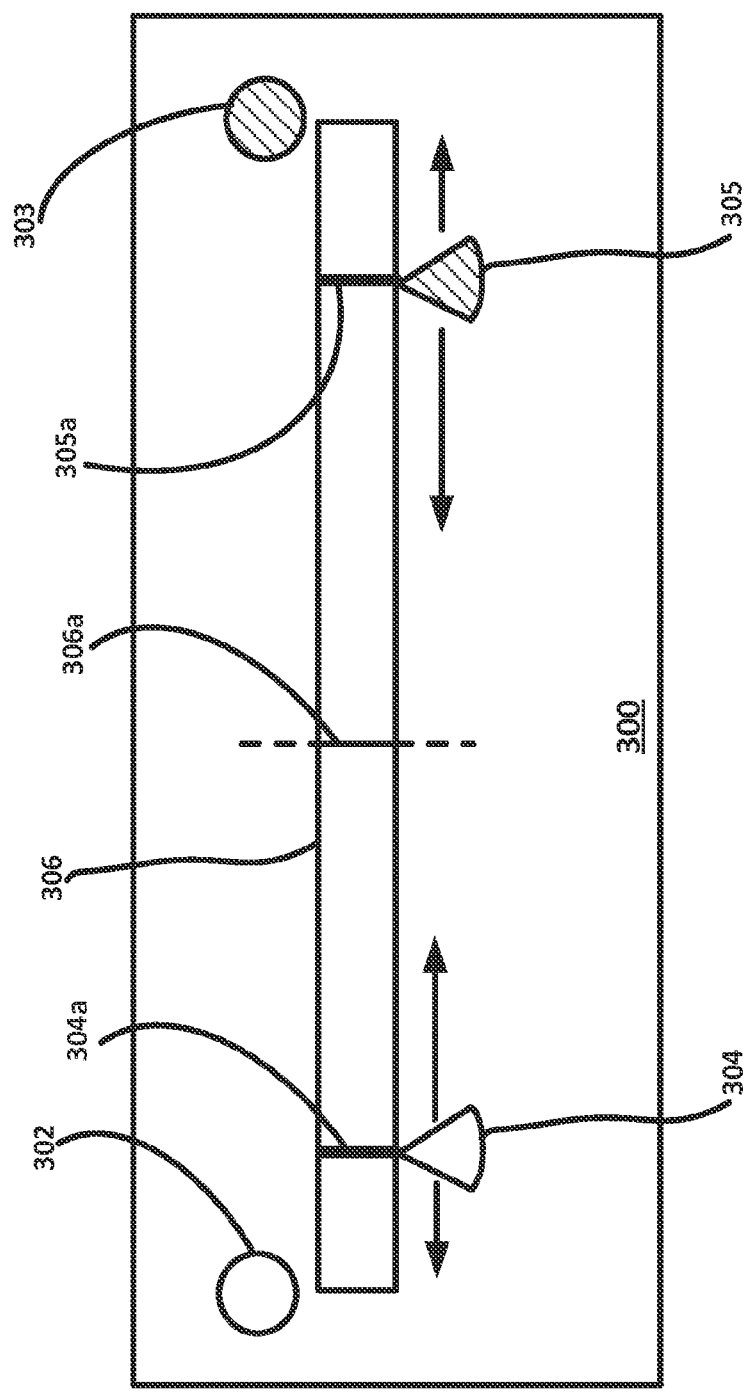
FIG. 3 illustrates an example embodiment for an interface of a computing for operation related to transitioning between the screens.

Next, in reference to FIG. 3, depicted is an example embodiment of an interface 300 for transitioning operation between dual screens 116, 117 of computing device 110, Extremes of ambient lighting brightness levels 302 (very bright) and 303 (very dark) are in a linear sliding scale 306 relative arrangement, having an intermediate level 306a there between. Upper threshold level selector 304 is movable between an upper limit 302 and intermediate level 306a to set upper threshold limit 304a for ambient lighting brightness level, beyond which secondary display screen 117 may be activated via processor 210 for displaying e-reading content upon computing device 110, and optionally primary display screen 116 may be de-activated. Lower threshold level selector 305 is movable to and from lower threshold limit 305a of ambient lighting brightness, again beyond which secondary display screen 117 may be activated for displaying e-reading content upon computing device 110, and optionally primary display screen 116 may be de-activated. In such manner, a user may customize by setting ambient lighting threshold levels outside of which e-reader device 110 automatically transitions from operation of primary display screen 116 to activation and operation of secondary display screen 117 for enhanced reading comfort during immersive e-reading, in accordance with those user-defined extremes of ambient lighting.

While a linear continuous sliding scale depiction is provided in FIG. 3, it is contemplated that other arrangements, including an accurate scale, a discrete grid, or a combination thereof, may be applied.

Figure 4:
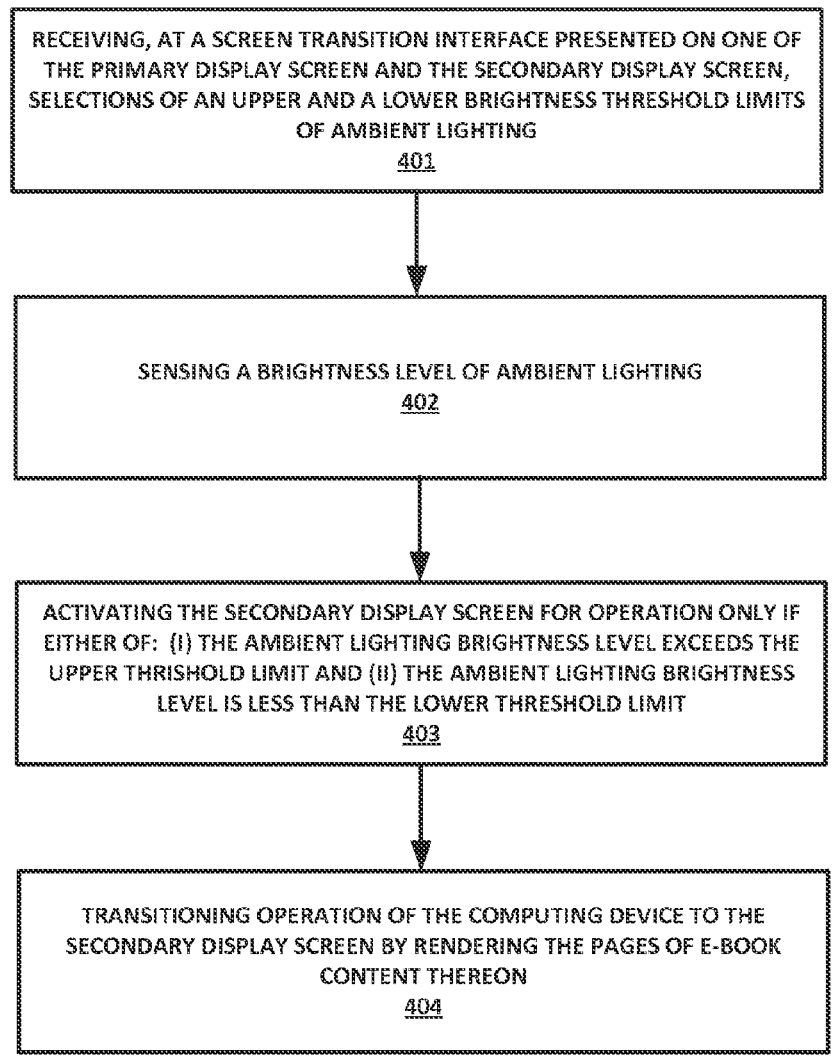
FIG. 4 illustrates a method for operating a computing device to transition between dual screens, according to an embodiment.

Next with reference to FIG. 4, illustrated is a method for operation transitioning operation between dual screens 116, 117 of computing device 110 depending on user-definable extremes of ambient lighting, according to an embodiment. In describing the example of FIG. 4, reference will be made to components such as described with regard to FIGS. 1 through 3 for purposes of illustrating components for performing a step or sub-step as described.

At step 401, receiving, at a screen transition interface 300 presented on one of the primary display screen 116 and the secondary display screen 117, selections of an upper and a lower brightness threshold limits 304a, 305a of ambient lighting.

At step 402, sensing a brightness level of ambient ting.

At step 403, activating the secondary display screen 117 for operation only if either of: (i) the ambient lighting brightness level exceeds the upper threshold limit 304a and (ii) the ambient lighting brightness level is less than the lower threshold limit 305a.

At step 404, transitioning operation of the computing device to the secondary display screen 117 by rendering the pages of e-book content thereon.

Although illustrative embodiments have been described in detail herein with reference to the accompanying drawings, variations to specific embodiments and details are contemplated and encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method executed in a processor of a computing device, the computing device including a primary touch screen display and a secondary touch screen display that is physically separate from the primary touch screen display, an ambient lighting brightness sensor, a memory storing instructions and an e-book having content displayable according to a series of digitally constructed pages, the method comprising:
   receiving, at a screen transition interface presented on one of the primary display screen and the secondary display screen, selections of an upper and a lower threshold limits of ambient lighting brightness;
   sensing a brightness level of ambient lighting;
   activating the secondary display screen for operation only if one of: (i) the ambient lighting brightness level exceeds the upper threshold limit and (ii) the ambient lighting brightness level is less than the lower threshold limit; and
   transitioning operation of the computing device to the secondary display screen by rendering the pages of e-book content thereon.

2. The method of claim 1 wherein the primary display screen comprises a liquid crystal display (LCD) screen.

3. The method of claim 1 wherein the primary display screen comprises a light emitting diode (LED) screen.

4. The method of claim 1 wherein the secondary display screen is a bi-stable e-ink display screen.

5. The method of claim 1 further comprising de-activating the primary display screen for operation in rendering the pages of e-book content.

6. The method of claim 1 wherein the ambient lighting brightness level is sensed by one of a light emitting diode, a photo-resistor and a phototransistor component in optical communication with the primary display screen.

7. The method of claim 1 wherein the ambient lighting brightness level is sensed by an electroluminescent panel in optical communication with the primary display screen.

8. The method of claim 1 wherein the screen transition interface comprises a linear sliding scale.

9. The method of claim 1 wherein the screen transition interface comprises a sliding scale.

10. The method of claim 1 wherein the screen transition interface comprises a grid having a plurality of ambient lighting brightness levels.

11. A computer-readable medium that stores instructions and an e-book for a computing device, the computing device including a processor, a primary display screen and a secondary display screen that is physically separate from the primary display screen, an ambient lighting brightness sensor, and a memory storing instructions and an e-book having digital content, the instructions being executable by the processor to cause the computing device to perform operations that include:
   receiving, at a screen transition interface presented on one of the primary display screen and the secondary display screen, selections of an upper and a lower threshold limits of ambient lighting brightness;
   sensing a brightness level of ambient lighting;
   activating the secondary display screen for operation only if one of: (i) the ambient lighting brightness level exceeds the upper threshold limit and (ii) the ambient lighting brightness level is less than the lower threshold limit; and
   transitioning operation of the computing device to the secondary display screen by rendering the pages of e-book content thereon.

12. A computing device comprising:
   a memory that stores a set of instructions and an e-book having digital content arranged in a series of digitally constructed pages;
   a primary display screen;
   a secondary display screen that is physically separate from the primary display screen;
   an ambient lighting brightness sensor; and
   a processor that access the instructions in memory, the processor further configured to:

receive, at a screen transition interface presented on one of the primary display screen and the secondary display screen, selections of an upper and a lower threshold limits of ambient lighting brightness;

sense a brightness level of ambient lighting;

activate the secondary display screen for operation only if one of: (i) the ambient lighting brightness level exceeds the upper threshold limit and (ii) the ambient lighting brightness level is less than the lower threshold limit; and transition operation of the computing device to the secondary display screen by rendering the pages of e-book content thereon.

13. The computing device of claim 12 wherein the primary display screen is a liquid crystal display (LCD) screen.

14. The computing device of claim 12 wherein the secondary display screen is an e-ink display screen.

15. The computing device of claim 11 wherein the secondary display screen is a bi-stable display screen.

16. The computing device of claim 11 further comprising de-activating the primary display screen for operation in rendering the pages of e-book content.

17. The computing device of claim 12 wherein the ambient lighting brightness level is sensed by one of a light emitting diode, a photo-resistor and a phototransistor component in optical communication with the primary display screen.

18. The computing device of claim 11 wherein the ambient lighting brightness level is sensed by an electroluminescent panel in optical communication with the primary display screen.

19. The computing device of claim 12 wherein the screen transition interface comprises a linear sliding scale.

20. The computing device of claim 12 wherein the screen transition interface comprises a scale.

* * * * *

UNITED STATES PATENT AND TRADEMARK OFFICE
CERTIFICATE OF CORRECTION

PATENT NO. : 9,558,710 B2  
APPLICATION NO. : 14/597920  
DATED : January 31, 2017  
INVENTOR(S) : Juan Ernesto Salas Imana Page 1 of 1

It is certified that error appears in the above-identified patent and that said Letters Patent is hereby corrected as shown below:

In the Specification

Column 2, Line 62, change "FIG. it illustrates" to --FIG. 1 illustrates--; and

Column 4, Line 37, change "Optical window 1 ii may be" to --Optical window 111 may be--.

Signed and Sealed this  
Eleventh Day of June, 2019

Andrei Iancu  
*Director of the United States Patent and Trademark Office*